US012570534B2

(12) United States Patent
Dao et al.

(10) Patent No.: US 12,570,534 B2
(45) Date of Patent: Mar. 10, 2026

(54) HOLLOW PARTICLE, METHOD OF PRODUCING THE HOLLOW PARTICLE, RESIN COMPOSITION, AND RESIN MOLDED PRODUCT AND LAMINATE EACH USING THE RESIN COMPOSITION

(71) Applicant: KYOWA CHEMICAL INDUSTRY CO., LTD., Takamatsu (JP)

(72) Inventors: Phuong Nguyen Duy Dao, Sakaide (JP); Tsukasa Nakamura, Sakaide (JP)

(73) Assignee: SETOLAS HOLDINGS, INC., Takamatsu (JP)

( * ) Notice: Subject to any disclaimer, the term of this patent is extended or adjusted under 35 U.S.C. 154(b) by 880 days.

(21) Appl. No.: 17/738,223

(22) Filed: May 6, 2022

(65) Prior Publication Data

US 2022/0363551 A1    Nov. 17, 2022

(30) Foreign Application Priority Data

May 7, 2021    (JP) .................................. 2021-079300

(51) Int. Cl.
*C01B 33/142*        (2006.01)
*C01B 33/193*        (2006.01)
(Continued)

(52) U.S. Cl.
CPC .............. *C01B 33/142* (2013.01); *C08K 7/26* (2013.01); *C01P 2004/03* (2013.01);
(Continued)

(58) Field of Classification Search
CPC ....... C01B 33/142; C01B 33/193; C08K 7/26; C08K 2201/003; C08K 2201/006;
(Continued)

(56) References Cited

U.S. PATENT DOCUMENTS

2001/0043996 A1* 11/2001 Yamada ................ C03C 11/002
                                                                  65/32.4
2002/0004111 A1*  1/2002 Matsubara .............. C03C 3/091
                                                                  428/34.4
(Continued)

FOREIGN PATENT DOCUMENTS

JP        2001-233611 A      8/2001
JP        2007-56158 A       3/2007
(Continued)

OTHER PUBLICATIONS

English Translation of JP 2014009145 A (Year: 2014).*
(Continued)

*Primary Examiner* — Paul A Wartalowicz
*Assistant Examiner* — Slone Elizabeth Simkins
(74) *Attorney, Agent, or Firm* — Birch, Stewart, Kolasch & Birch, LLP

(57)    ABSTRACT

Provided is a hollow particle, including silica, having a $D_{SL}$ of primary particles that satisfies the following expression (1), and having a breaking strength of 10 MPa or more: $1 \leq D_{SL} \leq 1.5$ ... (1) where $D_{SL}=D_{75L}/D_{25L}$, and $D_{25L}$ and $D_{75L}$ represent a 25th value and a 75th value, respectively, when long diameters of 100 randomly selected primary particles are measured in observation with a scanning electron microscope and sorted in order of increasing size.

21 Claims, 4 Drawing Sheets

(51) Int. Cl.

| | |
|---|---|
| *C08K 3/34* | (2006.01) |
| *C08K 7/26* | (2006.01) |
| *C08L 101/00* | (2006.01) |
| *C08K 3/36* | (2006.01) |

(52) U.S. Cl.
CPC ...... *C01P 2004/34* (2013.01); *C01P 2004/51* (2013.01); *C01P 2004/61* (2013.01); *C01P 2004/62* (2013.01); *C01P 2006/12* (2013.01); *C01P 2006/14* (2013.01); *C08K 2201/003* (2013.01); *C08K 2201/006* (2013.01)

(58) Field of Classification Search
CPC ......... C08K 3/36; C08K 3/34; C01P 2004/03; C01P 2004/34; C01P 2004/51; C01P 2004/61; C01P 2004/62; C01P 2006/12; C01P 2006/14; C01P 2006/10; B32B 27/20; C08L 101/00
See application file for complete search history.

(56) References Cited

U.S. PATENT DOCUMENTS

| | | | |
|---|---|---|---|
| 2010/0222487 A1 | 9/2010 | Nishi et al. | |
| 2019/0367376 A1* | 12/2019 | Bozkurt | ................ C01B 33/124 |
| 2024/0057252 A1* | 2/2024 | Okamoto | ............. H05K 1/0373 |

FOREIGN PATENT DOCUMENTS

| | | | | |
|---|---|---|---|---|
| JP | 2009-203115 | A | | 9/2009 |
| JP | 2010260755 | A | * | 11/2010 |
| JP | 2012-136363 | A | | 7/2012 |
| JP | 2014009145 | A | * | 1/2014 |
| JP | 2015218071 | A | * | 12/2015 |
| JP | 2017-226567 | A | | 12/2017 |
| KR | 10-2008-0091850 | A | | 10/2008 |
| WO | WO 2007/102569 | A1 | | 9/2007 |

OTHER PUBLICATIONS

English Translation of JP 2015218071 A (Year: 2015).*
English Translation of JP 2010260755 A (Year: 2010).*
Toyama, N., Umegaki, T., & Kojima, Y. (2015). Influence of si/al molar ratio of hollow silica-alumina composite spheres on their activity for hydrolytic dehydrogenation of ammonia borane. International Journal of Hydrogen Energy, 40(18), 6151-6157. (Year: 2015).*
English Translation of JP2015218071 Claims (Year: 2015).*
Japanese Office Action for Japanese Application No. 2021-079300, dated Feb. 27, 2024, with an English translation.
Korean Office Action for Korean Application No. 10-2022-0054554, dated Apr. 17, 2024, with an English translation.
Japanese Notice of Reasons for Refusal for Japanese Application No. 2021-079300, dated Jul. 4, 2023, with an English translation.
Taiwanese Office Action and Search Report for Taiwanese Application No. 111116778, dated Jul. 3, 2023, with an English translation.

* cited by examiner

HOLLOW PARTICLE, METHOD OF PRODUCING THE HOLLOW PARTICLE, RESIN COMPOSITION, AND RESIN MOLDED PRODUCT AND LAMINATE EACH USING THE RESIN COMPOSITION

CROSS-REFERENCE TO RELATED APPLICATION

The present application claims priority from Japanese Application JP 2021-79300 filed on May 7, 2021 the content of which is hereby incorporated by reference into this application.

BACKGROUND OF THE INVENTION

1. Field of the Invention

One or more embodiments of the present invention relates to a hollow particle, a method of producing the hollow particle, a resin composition, and to a resin molded product and a laminate each using the resin composition.

2. Description of the Related Art

In the field of, for example, information and communication equipment, there is a demand for reductions in dielectric constant and dielectric loss tangent of an electronic component (typically a resin component) to adapt to communication in a high-frequency band. To achieve the reductions, for example, there is a proposal that air, which has a low relative dielectric constant, be incorporated into the component. Specifically, there is a proposal that air be introduced through the use of hollow particles (see, for example, Japanese Patent Application Laid-open No. 2007-56158).

In view of increases in speed and capacity of information and communication equipment in recent years, further improvements in dielectric characteristics are required.

SUMMARY OF THE INVENTION

One or more embodiments of the present invention have been made to solve the above-mentioned problem, and an object thereof is to improve dielectric characteristics.

1. A hollow particle according to at least one embodiment of the present invention includes silica, has a $D_{SL}$ of primary particles that satisfies the following expression (1), and has a breaking strength of 10 MPa or more:

$$1 \leq D_{SL} \leq 1.5 \tag{1}$$

where $D_{SL}=D_{75L}/D_{25L}$, and $D_{25L}$ and $D_{75L}$ represent a 25th value and a 75th value, respectively, when long diameters of 100 randomly selected primary particles are measured in observation with a scanning electron microscope and sorted in order of increasing size.

2. The hollow particle according to the above-mentioned item 1 may have a BET specific surface area of 30 $m^2/g$ or less.

3. The hollow particle according to the above-mentioned item 1 or 2 may have a cumulative pore volume of pores having diameters of from 1 nm to 100 nm of 0.1 cc/g or less.

4. The hollow particle according to any one of the above-mentioned items 1 to 3 may have a hollow ratio of 30% or more and 95% or less.

5. The hollow particle according to any one of the above-mentioned items 1 to 4 may have an aspect ratio of less than 2.

6. The hollow particle according to any one of the above-mentioned items 1 to 5 may have a long diameter of 0.5 μm or more and 10 μm or less.

7. The hollow particle according to any one of the above-mentioned items 1 to 6 may have a shell thickness of 25 nm or more and 500 nm or less.

8. In the hollow particle according to any one of the above-mentioned items 1 to 7, the silica may be amorphous silica.

9. The hollow particle according to any one of the above-mentioned items 1 to 8 may further include Al, wherein the hollow particle may have a molar ratio of Al/Si of 0.0001 or more and 0.1 or less.

10. The hollow particle according to any one of the above-mentioned items 1 to 9 may further include Na, wherein the hollow particle may have a molar ratio of Na/Si of 0.001 or more and 0.025 or less.

11. A resin composition according to at least one embodiment of the present invention includes: a resin; and the hollow particle of any one of the above-mentioned items 1 to 10.

12. A resin molded product according to at least one embodiment of the present invention is formed from the resin composition of the above-mentioned item 11.

13. A laminate according to at least one embodiment of the present invention includes a resin layer formed from the resin composition of the above-mentioned item 11.

14. In the laminate according to the above-mentioned item 13, the resin layer may have a thickness of 25 μm or less.

15. A method of producing the hollow particle of any one of the above-mentioned items 1 to 10 according to at least one embodiment of the present invention, includes: coating a core particle with a shell-forming material to obtain a core-shell particle; removing the core particle from the core-shell particle to obtain a hollow particle precursor; and coating the hollow particle precursor with a shell-forming material.

16. In the production method according to the above-mentioned item 15, the core particle may contain an alunite type compound represented by the following general formula (I):

$$M_a[Al_{1-x}M'_x]_3(SO_4^{2-})_y(OH)_z \cdot mH_2O \tag{I}$$

in the formula (I), M represents at least one kind of cation selected from the group consisting of: $Na^+$; $K^+$; $NH_4^+$; and $H_3O^+$, M' represents at least one kind of cation selected from the group consisting of: $Cu^{2+}$; $Zn^{2+}$; $Ni^{2+}$; $Sn^{4+}$; $Zr^{4+}$; and $Ti^{4+}$, and "a", and "z" satisfy $0.8 \leq a \leq 1.35$, $0 \leq m \leq 5$, $0 \leq x \leq 0.4$, $1.7 \leq y \leq 2.5$, and $4 \leq z \leq 7$, respectively.

17. The production method according to the above-mentioned item 15 or 16 may further include calcining the core-shell particle before the removing the core particle.

18. In the production method according to the above-mentioned item 17, the calcining the core-shell particle may be performed at 650° C. or less.

19. The production method according to any one of the above-mentioned items 15 to 18 may further include calcining the hollow particle precursor coated with the shell-forming material.

20. In the production method according to the above-mentioned item 19, the calcining the hollow particle precursor may be performed at 900° C. or more.

21. The production method according to the above-mentioned item 19 or 20 may further include subjecting the hollow particle precursor to acid treatment before the calcining the hollow particle precursor.

22. In the production method according to any one of the above-mentioned items 15 to 21, the shell-forming materials each may contain sodium silicate.

DETAILED DESCRIPTION OF THE INVENTION

Embodiments of the present invention are described below. However, the present invention is not limited to these embodiments.

Definitions of Terms

The definitions of terms used herein are as described below.

1. Long Diameter of Particle

Figure 1:
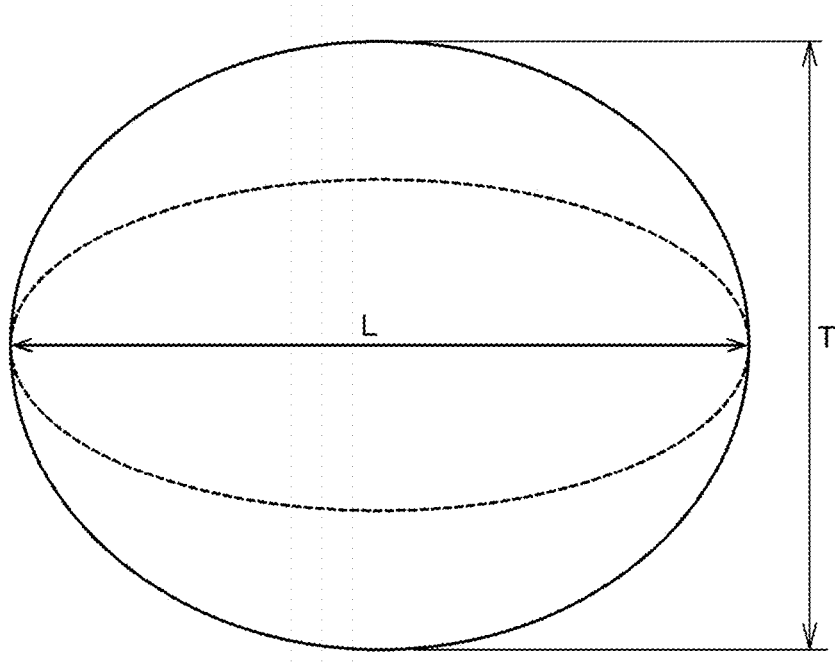
FIG. 1 is a schematic view for illustrating a long diameter and a short diameter.

The long diameter of a particle is a value measured with a scanning electron microscope (SEM), and is the average value of the long diameters (e.g., L of FIG. 1) of randomly selected primary particles. The "primary particles" are smallest particles observed with the SEM, and are distinguished from aggregated particles (secondary particles).

2. Short Diameter of Particle

The short diameter of a particle is a value measured through SEM observation, and is the average value of the short diameters (e.g., T of FIG. 1) of randomly selected primary particles.

3. Aspect Ratio (Long Diameter/Short Diameter)

An aspect ratio is a value calculated by dividing the long diameter of the particle by the short diameter of the particle.

A. Hollow Particle

A hollow particle according to at least one embodiment of the present invention is typically formed of silica (e.g., amorphous silica). The content of silica in the hollow particle is, for example, 95 wt % or more, preferably 97 wt % or more, more preferably 98 wt % or more.

The hollow particle may contain Al. The content of Al is, for example, 0.1 or less, preferably 0.08 or less, more preferably 0.04 or less in terms of molar ratio of Al/Si. Meanwhile, the content of Al is, for example, 0.0001 or more in terms of molar ratio of Al/Si. The content of Al may be, for example, 0.001 or more in terms of molar ratio of Al/Si. The molar ratio of Al/Si may be determined through composition analysis by energy dispersive X-ray spectroscopy (EDS).

The hollow particle may contain Na. The content of Na is, for example, 0.025 or less, preferably 0.020 or less in terms of molar ratio of Na/Si. Meanwhile, the content of Na is, for example, 0.001 or more in terms of molar ratio of Na/Si. The molar ratio of Na/Si may be determined through composition analysis by energy dispersive X-ray spectroscopy (EDS).

The Kubelka-Munk transformed (hereinafter sometimes referred to as "KM transformed") silanol group area of the hollow particle is preferably 1,500-/g or less, more preferably 1,000-/g or less, still more preferably 700-/g or less. According to at least one embodiment of the present invention, a high hollow ratio and/or a high breaking strength to be described later can be achieved as well as such low KM transformed silanol group area. Meanwhile, the KM transformed silanol group area of the hollow particle is, for example, 1-/g or more.

The primary particles of the hollow particle satisfy $1 \leq D_{SL} \leq 1.5$, preferably $1 \leq D_{SL} \leq 1.4$, more preferably $1 \leq D_{SL} \leq 1.3$. Here, $D_{SL}$ represents $D_{75L}/D_{25L}$, and $D_{25L}$ and $D_{75L}$ represent the 25th value and the 75th value, respectively, when the long diameters of 100 randomly selected primary particles are measured in observation with a scanning electron microscope and sorted in order of increasing size.

The primary particles of the hollow particle satisfy preferably $1 \leq D_{ST} \leq 1.5$, more preferably $1 \leq D_{ST} \leq 1.4$, still more preferably $1 \leq D_{ST} 1.3$. Here, $D_{ST}$ represents $D_{75T}/D_{25T}$, and $D_{25T}$ and $D_{75T}$ represent the 25th value and the 75th value, respectively, when the short diameters of 100 randomly selected primary particles are measured in observation with a scanning electron microscope and sorted in order of increasing size.

The aspect ratio of the hollow particle is preferably less than 2, more preferably 1.9 or less. Meanwhile, the aspect ratio of the hollow particle is 1 or more, preferably more than 1, more preferably 1.1 or more.

The hollow particle may have any appropriate shape. Examples of the shape of the hollow particle include an oval shape, a spherical shape, an aggregate shape, a flaky shape, a plate shape, a filmy shape, a cylindrical shape, a prism shape, a flat shape, a go stone shape, and a rice grain shape. Of those, a spherical shape or a go stone shape is preferably adopted. When such shape is adopted, for example, the $D_{SL}$ and the $D_{ST}$ can be satisfactorily satisfied.

The long diameter of the hollow particle is preferably 0.5 μm or more, more preferably 1 μm or more. This is because, for example, the hollow ratio to be described later can be sufficiently satisfied. Meanwhile, the long diameter of the hollow particle is preferably 10 μm or less, more preferably 5 μm or less. This is because, for example, a great contribution can be made to the downsizing (thinning) of a component for which the hollow particle is used.

The short diameter of the hollow particle is preferably 0.25 μm or more, more preferably 0.5 μm or more. This is because, for example, the hollow ratio to be described later can be sufficiently satisfied. Meanwhile, the short diameter of the hollow particle is preferably 10 μm or less, more preferably 5 μm or less. This is because, for example, a great contribution can be made to the downsizing (thinning) of a component for which the hollow particle is used.

The shell thickness of the hollow particle is preferably nm or more, more preferably 50 nm or more, still more preferably 75 nm or more. By virtue of such thickness, for example, the breakage of the hollow particle during the production of a resin composition to be described later can be effectively prevented. Meanwhile, the shell thickness of the hollow particle is preferably 500 nm or less, more preferably 350 nm or less, still more preferably 250 nm or less. By virtue of such thickness, the hollow ratio to be described later can be sufficiently satisfied, and great contributions can be made to the improvement of dielectric characteristics and light weighting. The shell thickness may be measured through TEM observation. The shell thickness is determined by, for example, measuring the shell thicknesses of randomly selected hollow particles and calculating the average value thereof.

The hollow ratio of the hollow particle is preferably 30% or more, more preferably 40% or more, still more preferably 45% or more, particularly preferably 50% or more. By virtue of such hollow ratio, for example, great contributions can be made to the improvement of dielectric characteristics and light weighting. Meanwhile, the hollow ratio of the hollow particle is preferably 95% or less, more preferably 90% or less, still more preferably 85% or less, particularly preferably 80% or less. By virtue of such hollow ratio, for example, the breakage of the hollow particle during the production of the resin composition to be described later can be effectively prevented. The hollow ratio may be calculated from the long diameter and the short diameter, and the shell thickness.

The ratio of the shell thickness to the long diameter (shell thickness/long diameter) is preferably 0.01 or more and 0.33 or less, more preferably 0.02 or more and 0.25 or less, still more preferably 0.03 or more and 0.25 or less.

The BET specific surface area of the hollow particle is preferably 30 $m^2/g$ or less, more preferably 20 $m^2/g$ or less, still more preferably 10 $m^2/g$ or less. Meanwhile, the BET specific surface area of the hollow particle is, for example, 0.5 $m^2/g$ or more, and may be 1 $m^2/g$ or more.

The pore volume (cumulative pore volume of pores having diameters of from 1 nm to 100 nm) of the hollow particle is preferably 0.1 cc/g or less, more preferably 0.08 cc/g or less, still more preferably 0.06 cc/g or less. By virtue of such pore volume, for example, the penetration of the resin into the hollow particle in the resin composition to be described later can be effectively prevented, to thereby make a great contribution to the improvement of dielectric characteristics. Meanwhile, the pore volume (cumulative pore volume of pores having diameters of from 1 nm to 100 nm) of the hollow particle is, for example, 0.01 cc/g or more.

The pore volume (cumulative pore volume of pores having diameters of from 1 nm to 10 nm) of the hollow particle is preferably 0.01 cc/g or less, more preferably 0.007 cc/g or less, still more preferably 0.005 cc/g or less. By virtue of such pore volume, for example, the penetration of the resin into the hollow particle in the resin composition to be described later can be effectively prevented, to thereby make a great contribution to the improvement of dielectric characteristics. Meanwhile, the pore volume (cumulative pore volume of pores having diameters of from 1 nm to 10 nm) of the hollow particle is, for example, 0.001 cc/g or more.

The breaking strength of the hollow particle is 10 MPa or more, preferably 12 MPa or more, more preferably 14 MPa or more, particularly preferably 16 MPa or more. By virtue of such breaking strength, for example, the breakage of the hollow particle during the production of the resin composition to be described later can be effectively prevented. As a result, the hollow state of the particle can be retained, to thereby make a great contribution to the improvement of dielectric characteristics. Meanwhile, the breaking strength of the hollow particle is, for example, 800 MPa or less.

In at least one embodiment of the present invention, the hollow particle is subjected to surface treatment with any appropriate surface treatment agent. As the surface treatment agent, at least one selected from the group consisting of: higher fatty acids; anionic surfactants; cationic surfactants; phosphoric acid esters; coupling agents; esters of polyhydric alcohols and fatty acids; acrylic polymers; and silicone treatment agents is used.

Any appropriate method may be adopted as a method of producing the hollow particle. A method of producing the hollow particle according to at least one embodiment of the present invention includes: coating a core particle with a shell-forming material to obtain a core-shell particle; removing the core particle from the core-shell particle to obtain a hollow particle precursor; and coating the hollow particle precursor with a shell-forming material. As a result of the coating of the hollow particle precursor with the shell-forming material, for example, a strong shell can be formed while a reduction in hollow ratio is suppressed. Specifically, the hollow particle precursor (shell) obtained by removing the core particle has pores, and hence may be in a brittle state, but the pores are filled with the shell-forming material, and hence the shell can be made strong without causing the shell to undergo shrinkage (e.g., softening shrinkage).

The primary particles of the core particle satisfy preferably $1 \leq D_{SL} \leq 1.5$, more preferably $1 \leq D_{SL} \leq 1.4$, particularly preferably $1 \leq D_{SL} \leq 1.3$. In addition, the primary particles of the core particle satisfy preferably $1 \leq D_{ST} \leq 1.5$, more preferably $1 \leq D_{ST} \leq 1.4$, particularly preferably $1 \leq D_{ST} \leq 1.3$. $D_{SL}$ and $D_{ST}$ are as described above.

The aspect ratio of the core particle is preferably less than 2, more preferably 1.9 or less. Meanwhile, the aspect ratio of the core particle is 1 or more, preferably more than 1, more preferably 1.1 or more. Examples of the shape of the core particle include an oval shape, a spherical shape, an aggregate shape, a flaky shape, a plate shape, a filmy shape, a cylindrical shape, a prism shape, a flat shape, a go stone shape, and a rice grain shape. Of those, a spherical shape or a go stone shape is preferably adopted.

The long diameter of the core particle is preferably 0.5 μm or more, more preferably 1 μm or more. Meanwhile, the long diameter of the core particle is preferably 10 μm or less, more preferably 5 μm or less. The short diameter of the core particle is preferably 0.25 μm or more, more preferably 0.5 μm or more. Meanwhile, the short diameter of the core particle is preferably 10 μm or less, more preferably 5 μm or less.

A material that can satisfactorily satisfy the $D_{SL}$ and the $D_{ST}$ is preferably used as a material for forming the core particle. In at least one embodiment of the present invention, the core particle is formed of an alunite type compound represented by the following general formula (I):

$$M_a[Al_{1-x}M'_x]_3(SO_4^{2-})_y(OH)_z \cdot mH_2O \qquad (I)$$

in the formula (I), M represents at least one kind of cation selected from the group consisting of: $Na^+$; $K^+$; $NH_4^+$; and $H_3O^+$, M' represents at least one kind of cation selected from the group consisting of: $Cu^{2+}$; $Zn^{2+}$; $Ni^{2+}$; $Sn^{4+}$; $Zr^{4+}$; and $Ti^{4+}$, and "a", "m", "x", "y", and "z" satisfy $0.8 \leq a \leq 1.35$, $0 \leq m \leq 5$, $0 \leq x \leq 0.4$, $1.7 \leq y \leq 2.5$, and $4 \leq z \leq 7$, respectively.

An alkoxysilane typified by sodium silicate ($Na_2O \cdot nSiO_2$) and tetraethoxysilane ($Si(OCH_2CH_3)_4$) is used as the shell-forming material. In at least one embodiment of the present invention, sodium silicate (water glass) is used. When Na is present, for example, the shell easily softens during calcining to be described later, and a calcining temperature can be easily controlled in some cases.

The amount of coating with the shell-forming material may be adjusted by any appropriate method. For example, the coating amount is adjusted by controlling a pH value when the coating is performed using a shell-forming material containing sodium silicate. Specifically, sodium silicate may be stable in a high pH region (e.g., at a pH of 11 or more), and hence, when the pH value is lowered, sodium silicate molecules are condensed to efficiently precipitate silica on the core particle. In this case, when the core particle contains the alunite type compound, a water slurry itself of the alunite type compound may exhibit acidity (e.g., a pH of from 3 to 5), and hence silica can be efficiently precipitated on the core particle without using, for example, a pH regulator for lowering the pH value. Heating (to, for example, from 80° C. to 90° C.) at the time of the coating with the shell-forming material can also promote the formation of the shell (specifically the precipitation and formation rates of the shell).

In addition, the coating amount may also be adjusted by controlling, for example, the concentration or blending amount of the shell-forming material at the time of the coating. When the core particle is coated with the shell-forming material containing sodium silicate, the concentration of the shell-forming material (sodium silicate) is, for example, from 0.1 mol/L to 2 mol/L.

The removal of the core particle is typically performed by dissolving the core particle in an acid solution. For example, hydrochloric acid, sulfuric acid, or nitric acid is used as the acid solution. A temperature at which the dissolution is performed is, for example, from 30° C. to 90° C., preferably from 50° C. to 80° C. By virtue of such temperature, the core particle can be efficiently dissolved while a problem in that, for example, the shell becomes liable to break is suppressed. In at least one embodiment of the present invention, for example, from the viewpoint of recycling a substance (e.g., a salt) obtained through a reaction with the core particle, sulfuric acid is used as the acid solution. The concentration of sulfuric acid is, for example, from 0.1 mol/L to 3 mol/L.

The method of producing the hollow particle may include calcining the core-shell particle before the removal of the core particle. When the core particle contains the alunite type compound, calcining (e.g., under an ambient air atmosphere) is preferably performed before the removal of the core particle. This is because, as the alunite type compound may have acid resistance, the alunite type compound is changed by the calcining to bring the core particle after the calcining into a state of being easy to dissolve in the acid solution. Specifically, a low-aggregation-density portion of the core particle containing the alunite type compound is easy to dissolve in the acid solution, but a high-aggregation-density portion thereof is hard to dissolve in the acid solution, with a dissolution amount in the acid solution being, for example, only about 30 wt %. Through the calcining, aluminum oxide ($Al_2O_3$), which is easy to dissolve in the acid solution, can be produced from the alunite type compound to improve the solubility of the core particle in the acid solution.

The temperature of the calcining of the core-shell particle is, for example, from 300° C. to 900° C., preferably from 300° C. to 650° C. By virtue of such calcining temperature, the aluminum oxide can be produced while the crystallization of the shell is suppressed. A calcining time is, for example, from 0.5 hour to 20 hours. The calcining may be continuously performed or may be performed in a plurality of stages at different temperatures. When the calcining is performed in a plurality of stages, the calcining time is the total of the calcining times of the respective stages.

The shell-forming material to be used for the coating of the hollow particle precursor is preferably selected in correspondence to the shell-forming material to be used for the coating of the core particle. Specifically, when sodium silicate is adopted as the shell-forming material to be used for the coating of the core particle, sodium silicate is preferably adopted as the shell-forming material to be used for the coating of the hollow particle precursor.

Also when the hollow particle precursor is coated with a shell-forming material containing sodium silicate, a coating amount is preferably adjusted by controlling a pH value. Specifically, sodium silicate may be stable in a high pH region (e.g., at a pH of 11 or more), and hence, for example, it is preferred that the pH value be lowered with a pH regulator to condense sodium silicate molecules, to thereby efficiently precipitate silica on the hollow particle precursor. For example, an acid solution, such as hydrochloric acid or sulfuric acid, is used as the pH regulator.

The method of producing the hollow particle may include calcining the hollow particle precursor coated with the shell-forming material. Specifically, the calcining of the hollow particle precursor may be performed after the coating of the hollow particle precursor with the shell-forming material. When the shell is calcined, a hollow particle capable of making a great contribution to the improvement of dielectric characteristics can be obtained. Specifically, the hydrophobicity of the surface of the shell can be improved. More specifically, a silanol group on the surface of the shell can be converted into a siloxane. In addition, there can be obtained a hollow particle that is easy to blend (disperse) in a resin in the production of the resin composition to be described later. Specifically, through moderate shrinkage (specifically softening shrinkage) caused by the calcining, hollow particles having smooth surfaces (e.g., capable of satisfactorily achieving the above-mentioned BET specific surface area and pore volume) can be obtained by filling the pores on the surface of the shell while preventing the particles from fusing to each other.

The temperature of the calcining of the hollow particle precursor is, for example, from 300° C. to 1,300° C., preferably from 700° C. to 1,300° C., more preferably from 900° C. to 1,300° C. By virtue of such calcining temperature, the improvement of the hydrophobicity can be satisfactorily achieved. In addition, it is a feature of at least one embodiment of the present invention that a high hollow ratio can be achieved even when calcining is performed at such calcining temperature. Specifically, when the hollow particle precursor in the state of having the pores filled by the coating with the shell-forming material is calcined, the improvement of the hydrophobicity can be satisfactorily achieved while the shrinkage (specifically softening shrinkage) of the shell is suppressed. The calcining time of the hollow particle precursor is, for example, from 0.1 hour to 10 hours. The calcining may be continuously performed or may be performed in a plurality of stages at different temperatures. When the calcining is performed in a plurality of stages, the calcining time is the total of the calcining times of the respective stages.

The method of producing the hollow particle may include subjecting the hollow particle precursor to acid treatment before the calcining of the hollow particle precursor. The acid treatment is typically performed using an acid solution, such as hydrochloric acid or sulfuric acid. When sodium silicate is adopted as the shell-forming material, the hollow particle precursor may contain Na. When Na is removed through the acid treatment, the calcining temperature of the hollow particle precursor can be set high, and a hollow particle capable of making a great contribution to the improvement of dielectric characteristics can be obtained.

In at least one embodiment of the present invention, the hollow particle is used as a function-imparting agent for a resin material. A resin composition containing the hollow particle is described below.

B. Resin Composition

A resin composition according to at least one embodiment of the present invention contains a resin and the hollow particle. In the resin composition (a resin molded product to be described later), the hollow state of the hollow particle can be satisfactorily retained.

Any appropriate resin may be selected as the resin in accordance with, for example, applications of the resin composition to be obtained. For example, the resin may be a thermoplastic resin, or may be a thermosetting resin. Specific examples of the resin include an epoxy resin, a polyimide resin, a polyamide resin, a polyamide imide resin, a polyether ether ketone resin, a polyester resin, a polyhydroxy polyether resin, a polyolefin resin, a fluorine resin, a liquid crystal polymer, and a modified polyimide. Those resins may be used alone or in combination thereof.

The content of the hollow particle in the resin composition is preferably 0.1 wt % or more, more preferably 0.5 wt % or more. Meanwhile, the content is preferably 90 wt % or less, more preferably 85 wt % or less.

The resin composition contains preferably 0.5 part by weight or more, more preferably 1 part by weight or more of the hollow particle with respect to 100 parts by weight of the resin. Meanwhile, the resin composition contains preferably 300 parts by weight or less, more preferably 200 parts by weight or less of the hollow particle with respect to 100 parts by weight of the resin.

The volume ratio of the hollow particle in the resin composition is preferably 0.1% or more, more preferably 0.5% or more. Meanwhile, the volume ratio of the hollow particle in the resin composition is preferably 70% or less, more preferably 60% or less. This is because, for example, processability in the production of the resin composition can be excellent.

The hollow ratio of the particle (filler) in the resin composition (resin molded product) is preferably 30% or more, more preferably 40% or more, still more preferably 45% or more, particularly preferably 50% or more.

The resin composition may contain an optional component. Examples of the optional component include a curing agent (specifically, a curing agent for any of the above-mentioned resins), a stress-reducing agent, a colorant, an adhesiveness-improving agent, a release agent, a flow adjuster, a defoaming agent, a solvent, and a filler. Those components may be used alone or in combination thereof. In at least one embodiment of the present invention, the resin composition contains a curing agent. The content of the curing agent is, for example, from 1 part by weight to 150 parts by weight with respect to 100 parts by weight of the resin.

Any appropriate method may be adopted as a method of producing the resin composition. Specifically, the resin composition is obtained by dispersing the hollow particle in the resin by any appropriate dispersion method. Examples of the dispersion method include: dispersion with any of various stirring machines, such as a homo-mixer, a disper, and a ball mill; dispersion with a rotation-revolution mixer; dispersion with a shear force using a triple roll; and dispersion by ultrasonic treatment.

The resin composition is typically turned into a resin molded product molded into a desired shape. For example, the resin composition is turned into a resin molded product molded into a desired shape through use of a mold. At the time of the molding of the resin molded product, the resin composition may be subjected to any appropriate treatment (e.g., curing treatment).

In at least one embodiment of the present invention, the resin composition is turned into a resin layer to be included in a laminate. A laminate including a resin layer formed from the resin composition is described below.

C. Laminate

Figure 2:
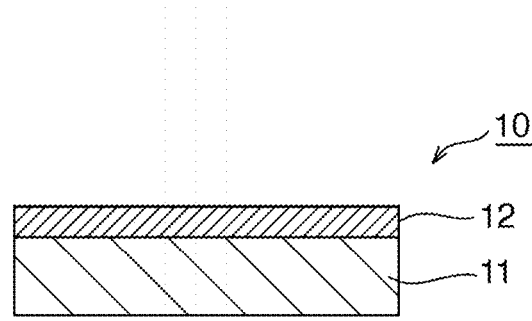
FIG. 2 is a schematic cross-sectional view of a laminate according to at least one embodiment of the present invention.

FIG. 2 is a schematic cross-sectional view of a laminate according to at least one embodiment of the present invention. A laminate 10 includes a resin layer 11 and a metal foil 12. The resin layer 11 is formed from the resin composition. Specifically, the resin layer 11 contains the resin and the hollow particle. The laminate 10 may include another layer (not shown). An example thereof is a base material (typically a resin film) laminated on one side of the resin layer 11 (side thereof on which the metal foil 12 is not arranged). The laminate 10 is typically used as a printed circuit board.

The thickness of the resin layer is, for example, 5 μm or more, preferably 10 μm or more. Meanwhile, the thickness of the resin layer is, for example, 100 μm or less, preferably 50 μm or less, more preferably 25 μm or less. By virtue of such thickness, for example, the laminate can sufficiently adapt to the downsizing of an electronic component in recent years.

Any appropriate metal may be used as a metal for forming the metal foil. Examples thereof include copper, aluminum, nickel, chromium, and gold. Those metals may be used alone or in combination thereof. The thickness of the metal foil is, for example, from 2 μm to 35 μm.

Any appropriate method may be adopted as a method of producing the laminate. The laminate is obtained by, for example, applying the resin composition onto the base material to form an applied layer, and laminating the metal foil onto the applied layer. As another specific example, the laminate is obtained by applying the resin composition to the metal foil to form an applied layer. The applied layer is typically cured by subjecting the applied layer to treatment, such as heating or light irradiation, at any appropriate timing. When applied, the resin composition may be used by being dissolved in any appropriate solvent.

EXAMPLES

The present invention is specifically described below by way of Examples, but the present invention is not limited by these Examples. Methods of measuring characteristics are as described below unless otherwise stated.

1. Long Diameter of Particle

The long diameter of a particle was calculated through FE-SEM observation. Specifically, the long diameters of 100 primary particles randomly selected from SEM photographs of particles were measured, and the arithmetic average of the resultant measured values (average long diameter) was determined. The magnification of the SEM observation was set to 10,000 times.

2. Short Diameter of Particle

The short diameter of a particle was calculated through FE-SEM observation. Specifically, the short diameters of 100 primary particles randomly selected from SEM photographs of particles were measured, and the arithmetic average of the resultant measured values (average short diameter) was determined. The magnification of the SEM observation was set to 10,000 times.

3. $D_{SL}$ and $D_{ST}$

Calculation was performed through FE-SEM observation. Specifically, the long diameter of each of 100 primary particles randomly selected from SEM photographs of particles was measured, and $D_{SL}$ was calculated by dividing the 75th smallest value ($D_{75L}$) by the 25th smallest value ($D_{25L}$). In addition, the short diameter of each of 100 primary particles randomly selected from SEM photographs of particles was measured, and $D_{ST}$ was calculated by dividing the 75th smallest value ($D_{75T}$) by the 25th smallest value ($D_{25T}$).

4. Aspect Ratio

An aspect ratio was calculated through FE-SEM observation. Specifically, the aspect ratio was calculated by dividing the average long diameter of the particles by the average short diameter of the particles.

5. Shell Thickness of Hollow Particle

The shell thickness of a particle was calculated through TEM observation. Specifically, the shell thicknesses of 10 primary particles randomly selected from TEM photographs of particles were measured, and the arithmetic average of the resultant measured values (average thickness) was determined. The magnifications of the TEM observation were set to 10,000 times and 100,000 times.

6. Hollow Ratio

A hollow ratio was calculated from the long diameter and the short diameter, and the shell thickness. Specifically, through use of the primary particle diameters (long diameter and short diameter) and the shell thickness, the hollow ratio was calculated by the following equation through approximation of the volume of the particle on the assumption that the shape thereof was a cylinder.

Hollow ratio=hollow region volume of hollow particle÷volume of hollow particle×100

Volume of hollow particle=π×radius²×height=π×(long diameter÷2)²×short diameter

Hollow region volume of hollow particle=π×((long diameter−shell thickness×2)÷2)²×(short diameter−shell thickness×2)

7. BET Specific Surface Area

Measurement was performed with "BELsorp-mini" from MicrotracBEL Corp. Specifically, measurement was performed by a constant-volume gas adsorption method using a nitrogen gas, and a specific surface area was determined through analysis by a BET multipoint method.

8. Pore Volume

Measurement was performed with "BELsorp-max" from MicrotracBEL Corp. Specifically, measurement was performed by a constant-volume gas adsorption method using a nitrogen gas, and pore volumes (cumulative pore volume of pores having diameters of from 1 nm to 100 nm and cumulative pore volume of pores having diameters of from 1 nm to 10 nm) were determined through analysis by a BJH method.

9. Breaking Strength

Breaking strength was measured with a micro compression testing machine ("MCT-510" manufactured by Shimadzu Corporation) through use of its length measurement kit and side observation kit. Specifically, a trace amount of a sample was sprayed onto a lower pressure plate, and a breaking test was performed for individual particles under the following conditions.

Test force: 0.980 mN

Loading rate: 0.0223 mN/sec

Upper pressure indenter: flat, φ20 μm

The measurement was performed for 10 particles, breaking strength Cs (MPa) was calculated from the measured values of the particle diameter "d" (mm) of each of the particles and the test force P (N) at the breaking point thereof, and an average value was calculated.

The breaking strength Cs was calculated from the following equation of JIS R 1639-5: "Test methods of properties of fine ceramic granules Part 5: Compressive strength of a single granule."

$$Cs=2.48P/\pi d^2$$

10. KM Transformed Silanol Group Area

A silanol group amount (silanol group area) was measured by an FT-IR diffuse reflectance method. Specifically, the measurement was performed with a Fourier transform infrared spectrophotometer ("FT/IR-4100" manufactured by JASCO Corporation) using a diffuse reflectance method measurement kit ("DR PRO410-M model" manufactured by JASCO Corporation) and using 0.017 g of a background sample KBr and a predetermined amount (0.0014 g to 0.0031 g) of a measurement sample.

The resultant spectrum was subjected to Kubelka-Munk (KM) transform processing to be quantitatively analyzed. Specifically, the area of peaks at from 3,900 cm⁻¹ to 3,100 cm⁻¹ including silanol groups was determined, and a KM transformed silanol group area per unit weight (-/g) was calculated.

The range of from 3,900 cm⁻¹ to 3,100 cm⁻¹ includes an isolated silanol group at 3,740 cm⁻ᴸ an isolated silanol group adjacent thereto at 3,650 cm⁻ᴸ and a silanol group derived from surface-adsorbed water around 3,400 cm⁻¹.

Example 1

(Preparation of Hollow Silica Particles)

100 g of powder of alunite particles each having an oval shape ($NaAl_3(SO_4)_2(OH)_6$, long diameter: 1.98 μm, $D_{SL}$: 1.13, short diameter: 1.35 μm, $D_{ST}$: 1.18, aspect ratio: 1.47) was suspended in 0.675 L of ion-exchanged water to provide a slurry of the alunite particles.

Then, the resultant slurry of the alunite particles was heated to 90° C. while being stirred, and 98.62 ml of 0.538 mol/L No. 3 water glass ($Na_2O.3.14SiO_2$, manufactured by FUJIFILM Wako Pure Chemical Corporation) was added thereto over 4 hours. The thus obtained slurry was aged for 1 hour, followed by dewatering and water washing to provide a cake of a core-shell particle precursor 1.

Then, the resultant cake of the core-shell particle precursor 1 was suspended in 0.675 L of ion-exchanged water, the suspension was heated to 90° C. while being stirred, and 98.62 ml of 0.538 mol/L No. 3 water glass was added thereto over 2 hours. The thus obtained slurry was aged for 1 hour, and left under stirring for 15 hours, followed by dewatering and water washing to provide a cake of a core-shell particle precursor 2. The resultant cake of the core-shell particle precursor 2 was suspended in 0.675 L of ion-exchanged water, the suspension was heated to 90° C. while being stirred, and 98.62 ml of 0.538 mol/L No. 3 water glass was added thereto over 2 hours. The thus obtained slurry was aged for 1 hour, and left under stirring for 15 hours, followed by dewatering and water washing. After that, the resultant was dried at 100° C. for 1 day to provide powder of core-shell particles.

Then, the resultant powder of the core-shell particles was calcined at 500° C. for 3 hours and at 550° C. for 1 hour. It is conceived that the calcining changes the alunite particles as shown below.

$$NaAl_3(SO_4)_2(OH)_6 \rightarrow NaAl(SO_4)_2 + Al_2O_3 + 3H_2O$$

Then, 1 L of ion-exchanged water was added to 101.4 g of the calcined core-shell particles, and resuspension was performed at room temperature under stirring. 866 ml of 1.1 mol/L sulfuric acid was added to the suspension, and the mixture was heated to 90° C. and subjected to a reaction for 5 hours to dissolve the core particles, to thereby provide a slurry of a hollow silica precursor 1. The resultant slurry of the hollow silica precursor 1 was dewatered and washed with water to provide a cake of the hollow silica precursor 1.

Then, the resultant cake of the hollow silica precursor 1 was suspended in 1 L of ion-exchanged water, the suspension was heated to 90° C. while being stirred, and 7.4 ml of 0.538 mol/L No. 3 water glass was added thereto over 10 minutes. After that, further, 36.98 ml of 0.538 mol/L No. 3 water glass and 42.99 ml of 0.5 mol/L sulfuric acid began to be added simultaneously. The No. 3 water glass was added over 50 minutes, and the sulfuric acid was added over 60 minutes. The thus obtained slurry was aged for 30 minutes, followed by dewatering and water washing to provide a hollow silica precursor cake. The same operation as the foregoing was repeated two more times to provide a cake of a hollow silica precursor 2.

Then, to the resultant cake of the hollow silica precursor 2, 0.675 L of ion-exchanged water and 46 ml of 2 mol/L sulfuric acid were added, and the mixture was left at 90° C. for 1 hour and a half to provide a slurry of a hollow silica precursor 3. After that, dewatering and water washing were performed, and the resultant cake was dried at 100° C. for 1 day to provide powder of the hollow silica precursor 3.

Then, the resultant powder of the hollow silica precursor 3 was calcined in an electric furnace (under an ambient air atmosphere) at 1,100° C. for 2 hours to provide hollow silica particles (long diameter: 1.96 μm, $D_{SL}$: 1.13, short diameter: 1.63 μm, $D_{ST}$: 1.33, aspect ratio: 1.20, shell thickness: 97 nm, hollow ratio: 72%, BET specific surface area: 7.5 m²/g, pore volume: 0.033 cc/g, breaking strength: 20.8 MPa, KM transformed silanol group area: 695-/g). For the resultant hollow silica particles, a ratio between Al derived from the core particles and Si derived from the silica shell was calculated through composition analysis by EDS measurement using "JED-2300" manufactured by JEOL Ltd., and as a result, the molar ratio of Al/Si was found to be 0.018.
(Preparation of Resin Composition)

44.23 g of a bisphenol F-type epoxy resin ("JER806" manufactured by Mitsubishi Chemical Corporation) and 9.00 g of the resultant hollow silica particles (sometimes referred to as "filler") were mixed using a rotation-revolution mixer ("ARV-310P" manufactured by Thinky Corporation) under the conditions of atmospheric pressure, 1,000 rpm rotation, and 2,000 rpm revolution for 3 minutes to provide a mixture.

The resultant mixture and 2.21 g of an imidazole-based epoxy resin curing agent ("2E4MZ" manufactured by Shikoku Chemicals Corporation) were mixed using the rotation-revolution mixer under the conditions of 1,000 rpm rotation, 2,000 rpm revolution, and 0.7 kPa for 3 minutes to provide a resin composition.
(Production of Resin Molded Product)

The resultant resin composition was poured into a mold made of Teflon (trademark) having a thickness of 1.0 mm and was press-molded at 80° C. for 1 hour. After having been cooled, the molded product was removed from the mold, and placed in a dryer at 150° C. for 4 hours to be further heated and cured. After that, the molded product was cooled to provide an evaluation sample.

Example 2

(Preparation of Hollow Silica Particles)

100 g of powder of alunite particles each having an oval shape ($NaAl_3(SO_4)_2(OH)_6$, long diameter: 1.98 μm, $D_{SL}$: 1.13, short diameter: 1.35 μm, $D_{ST}$: 1.18, aspect ratio: 1.47) was suspended in 0.5 L of ion-exchanged water to provide a slurry of the alunite particles.

Then, the resultant slurry of the alunite particles was heated to 90° C. while being stirred, and 100 ml of 0.528 mol/L No. 3 water glass ($Na_2O.3.14SiO_2$, manufactured by FUJIFILM Wako Pure Chemical Corporation) was added thereto over 4 hours. The thus obtained slurry was aged for 1 hour, followed by dewatering and water washing to provide a cake of a core-shell particle precursor 1.

Then, the resultant cake of the core-shell particle precursor 1 was suspended in 0.5 L of ion-exchanged water, the suspension was heated to 90° C. while being stirred, and 150 ml of 0.538 mol/L No. 3 water glass was added thereto over 2 hours. The thus obtained slurry was aged for 1 hour, and left under stirring for 15 hours, followed by dewatering and water washing to provide a cake of a core-shell particle precursor 2. The resultant cake of the core-shell particle precursor 2 was suspended in 0.5 L of ion-exchanged water, the suspension was heated to 90° C. while being stirred, and 150 ml of 0.538 mol/L No. 3 water glass was added thereto over 2 hours. The thus obtained slurry was aged for 1 hour, and left under stirring for 15 hours, followed by dewatering and water washing. After that, the resultant was dried at 100° C. for 1 day to provide powder of core-shell particles.

Then, the resultant powder of the core-shell particles was calcined at 500° C. for 3 hours and at 550° C. for 1 hour. It is conceived that the calcining changes the alunite particles as shown below.

$$NaAl_3(SO_4)_2(OH)_6 \rightarrow NaAl(SO_4)_2 + Al_2O_3 + 3H_2O$$

Then, 1 L of ion-exchanged water was added to 90.7 g of the calcined core-shell particles, and resuspension was performed at room temperature under stirring. 688 ml of 1.1 mol/L sulfuric acid was added to the suspension, and the mixture was heated to 90° C. and subjected to a reaction for 5 hours to dissolve the core particles, to thereby provide a slurry of a hollow silica precursor 1. The resultant slurry of the hollow silica precursor 1 was dewatered and washed with water to provide a cake of the hollow silica precursor 1.

Then, the resultant cake of the hollow silica precursor 1 was suspended in 1 L of ion-exchanged water, the suspension was heated to 90° C. while being stirred, and 26.18 ml of 0.538 mol/L No. 3 water glass was added thereto over 10 minutes. After that, further, 130.82 ml of 0.538 mol/L No. 3 water glass and 149.88 ml of 0.5 mol/L sulfuric acid began to be added simultaneously. The No. 3 water glass was added over 50 minutes, and the sulfuric acid was added over 60 minutes. The thus obtained slurry was aged for 30 minutes, followed by dewatering and water washing to provide a hollow silica precursor cake. The same operation as the foregoing was repeated two more times, and the resultant cake was dried at 100° C. for 1 day to provide powder of a hollow silica precursor 2.

Then, the resultant powder of the hollow silica precursor 2 was calcined in an electric furnace (under an ambient air atmosphere) at 1,100° C. for 2 hours to provide hollow silica particles (long diameter: 2.16 μm, $D_{SL}$: 1.10, short diameter: 1.85 μm, $D_{ST}$: 1.15, aspect ratio: 1.17, shell thickness: 235 nm, hollow ratio: 46%, BET specific surface area: 4.8 m²/g, pore volume: 0.029 cc/g, KM transformed silanol group area: 663-/g). The molar ratio of Al/Si was 0.019.

(Production of Resin Molded Product)

A molded product (evaluation sample) was obtained in the same manner as in Example 1 except that: the above-mentioned hollow silica particles were used; and the blending amount of the hollow silica particles was changed to 13.93 g.

Comparative Example 1

(Preparation of Hollow Silica Particles)

2.38 kg of powder of alunite particles each having an oval shape ($NaAl_3(SO_4)_2(OH)_6$, long diameter: 1.48 μm, $D_{SL}$: 1.10, short diameter: 1.08 μm, $D_{ST}$: 1.09, aspect ratio: 1.36) was suspended in 15.8 L of ion-exchanged water to provide a slurry of the alunite particles.

Then, the resultant slurry of the alunite particles was heated to 90° C. while being stirred, and 2.322 L of 0.57 mol/L No. 3 water glass ($Na_2O.3.14SiO_2$, manufactured by FUJIFILM Wako Pure Chemical Corporation) was added thereto over 4 hours. The thus obtained slurry was aged for 1 hour, followed by dewatering and water washing to provide a cake of a core-shell particle precursor 1.

Then, the resultant cake of the core-shell particle precursor 1 was suspended in 15.8 L of ion-exchanged water, the suspension was heated to 90° C. while being stirred, and 2.322 L of 0.57 mol/L No. 3 water glass was added thereto over 2 hours. The thus obtained slurry was aged for 1 hour, followed by dewatering and water washing to provide a cake of a core-shell particle precursor 2. The resultant cake of the core-shell particle precursor 2 was suspended in 15.8 L of ion-exchanged water, the suspension was heated to 90° C. while being stirred, and 2.322 L of 0.57 mol/L No. 3 water glass was added thereto over 2 hours. The thus obtained slurry was aged for 1 hour, followed by dewatering and water washing. After that, the resultant was dried at 100° C. for 1 day to provide powder of core-shell particles.

Then, the resultant powder of the core-shell particles was calcined at 500° C. for 3 hours and at 550° C. for 1 hour. It is conceived that the calcining changes the alunite particles as shown below.

$$NaAl_3(SO_4)_2(OH)_6 \rightarrow NaAl(SO_4)_2 + Al_2O_3 + 3H_2O$$

Then, 1 L of ion-exchanged water was added to 2,170 g of the calcined core-shell particles, and resuspension was performed at room temperature under stirring. 15 L of 1.26 mol/L sulfuric acid was added to the suspension, and the mixture was heated to 90° C. and subjected to a reaction for 5 hours to dissolve the core particles, to thereby provide a slurry of a hollow silica precursor 1. The resultant slurry of the hollow silica precursor 1 was dewatered and washed with water to provide a cake of the hollow silica precursor 1. The resultant cake was dried at 100° C. for 1 day to provide powder of the hollow silica precursor 1.

Then, the resultant powder of the hollow silica precursor 1 was calcined in an electric furnace (under an ambient air atmosphere) at 800° C. for 2 hours to provide hollow silica particles (long diameter: 1.55 μm, $D_{SL}$: 1.10, short diameter: 1.12 μm, $D_{ST}$: 1.14, aspect ratio: 1.38, shell thickness: 54 nm, hollow ratio: 78%, BET specific surface area: 39 m²/g, pore volume: 0.136 cc/g, KM transformed silanol group area: 230,718-/g). The molar ratio of Al/Si was 0.027.

(Production of Resin Molded Product)

A molded product (evaluation sample) was obtained in the same manner as in Example 1 except that: the above-mentioned hollow silica particles were used; and the blending amount of the hollow silica particles was changed to 2.79 g. Attempts were made to blend the hollow silica particles so as to achieve a blending amount comparable to those in Examples, but the blending of an amount larger than the foregoing was impossible because the particles broke, or because a varnish obtained by blending the epoxy resin and the curing agent with the particles was thickened and subjected to frictional heat to cause heat generation, which promoted the curing of the resin.

Conceivable causes of the failure to achieve a blending amount comparable to those in Examples are the high BET specific surface area, the high pore volume, the high silanol group amount, and an increase in specific surface area due to the breakage of the hollow particles.

Comparative Example 2

A molded product (evaluation sample) was obtained in the same manner as in Example 1 except that the hollow silica particles were not blended.

<XRD Measurement>

The hollow silica particles of Examples 1 and 2 and Comparative Example 1 were analyzed by X-ray diffraction ("EMPYRIAN" manufactured by PANalytical), and as a result, were found to be amorphous silica.

<FE-SEM Observation>

Figure 3A:
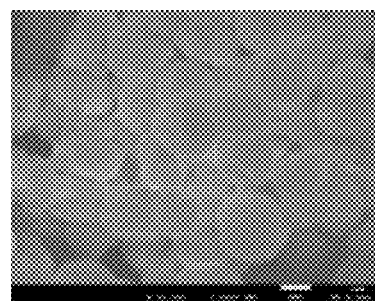
FIG. 3A is an SEM observation photograph of hollow particles of Example 1.
Figure 3B:
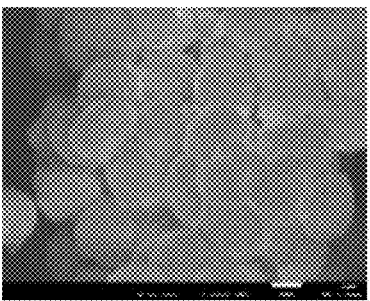
FIG. 3B is an SEM observation photograph of hollow particles of Example 2.
Figure 3C:
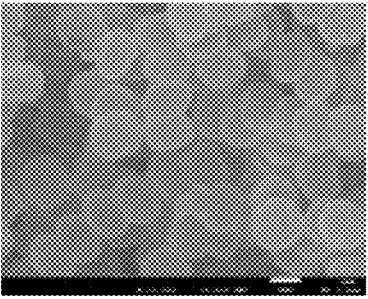
FIG. 3C is an SEM observation photograph of hollow particles of Comparative Example 1.

The hollow silica particles of Examples 1 and 2 and Comparative Example 1 were observed with a scanning electron microscope ("JSM-7600F" manufactured by JEOL Ltd.) (magnification: 10,000 times). The observation result of the hollow silica particles of Example 1 is shown in FIG. 3A, the observation result of the hollow silica particles of Example 2 is shown in FIG. 3B, and the observation result of the hollow silica particles of Comparative Example 1 is shown in FIG. 3C. In each of the cases, it can be recognized that the particles have uniform particle diameters.

<TEM Observation>

Figure 4A:
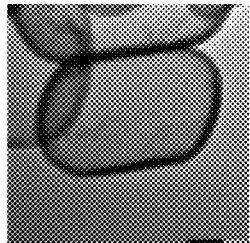
FIG. 4A is a TEM observation photograph of the hollow particles of Example 1.
Figure 4B:
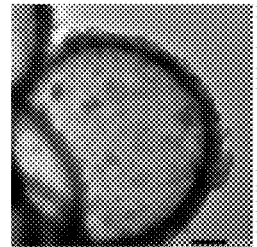
FIG. 4B is a TEM observation photograph of the hollow particles of Example 2.
Figure 4C:
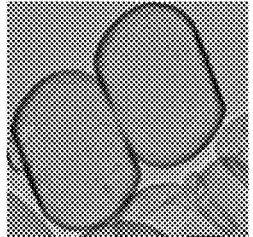
FIG. 4C is a TEM observation photograph of the hollow particles of Comparative Example 1.

The hollow silica particles of Examples 1 and 2 and Comparative Example 1 were observed with a transmission electron microscope ("JEM-2100PLUS" manufactured by JEOL Ltd.) (magnification: 10,000 times). The observation result of the hollow silica particles of Example 1 is shown in FIG. 4A, the observation result of the hollow silica particles of Example 2 is shown in FIG. 4B, and the observation result of the hollow silica particles of Comparative Example 1 is shown in FIG. 4C. In each of the cases, it can be recognized that the hollow particles retain the oval shape of the core particles.

<Evaluation of Resin Molded Product>

The resin molded product (evaluation sample) of each of Examples and Comparative Examples was subjected to measurement of density, cross-sectional observation, and measurement of dielectric characteristics. In addition, the porosity of the resin molded product and the filler hollow ratio in the resin molded product were calculated. Evalua-

Figure 5A:
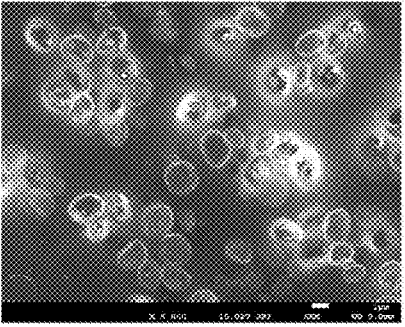
FIG. 5A is a cross-sectional SEM observation photograph of a resin molded product of Example 1.
Figure 5B:
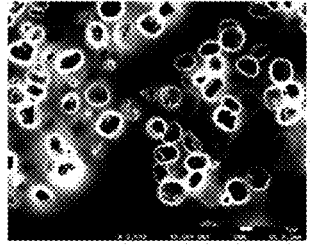
FIG. 5B is a cross-sectional SEM observation photograph of a resin molded product of Example 2.
Figure 5C:
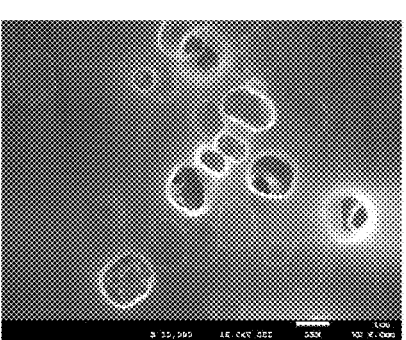
FIG. 5C is a cross-sectional SEM observation photograph of a resin molded product of Comparative Example 1.

17 tion results are summarized in Table 1. In addition, the observation result of the resin molded product of Example 1 is shown in FIG. 5A, the observation result of the resin molded product of Example 2 is shown in FIG. 5B, and the observation result of the resin molded product of Comparative Example 1 is shown in FIG. 5C.

(Measurement of Density)

The density of a resin molded product was measured with an electronic densitometer ("SD120L" manufactured by Alfa Mirage Co., Ltd.). Specifically, each obtained resin molded product was cut with an ultrasonic cutter into a size of 5 cm×6 cm, and the molded product sample obtained by the cutting was subjected to the measurement.

(Porosity of Resin Molded Product)

The porosity of the resin molded product (ratio of the volume of air in the resin molded product) Va % was calculated from the result of the measurement of the density.

(Filler Hollow Ratio in Resin Molded Product)

A filler hollow ratio Va/(Va+Vs) in the resin molded product was calculated from the value of the porosity Va % of the resin molded product. Here, Vs may be determined from the following equation.

$$Vc = Vs + Va + Vr$$

$$=> Va\% = 100\frac{Va}{Vc} = 100\frac{Vc - Vs - Vr}{Vc}$$

$$=> Va\% = 100\frac{mc/\rho c - ms/\rho s - mr/\rho r}{mc/\rho c}$$

$$=> Va\% = 100\frac{(100 + wf)/\rho c - wf/\rho s - 100/\rho r}{(100 + wf)/\rho c}$$

Vc: volume of the resin molded product
Vs: volume of the shells of the particles
Va: volume of air in the resin molded product
Vr: volume of the resin
mc: weight (g) of the resin molded product
ρc: density (g/ml) of the resin molded product
ms: weight (g) of the particles (shells)
ρs: density of the shells of the particles (2.28 (g/ml))
mr: weight (g) of the resin
ρr: density (g/ml) of the resin
wf: parts by weight (phr) of the particles (filler) with respect to 100 parts by weight (phr) of weight of the resin (Cross-Sectional Observation of Resin Molded Product)

The obtained molded product sample was cut with a cross section polisher ("IB-09010CP" manufactured by JEOL Ltd.), and the cross-section was observed by FE-SEM ("JSM-7600F" manufactured by JEOL Ltd., magnification: 5,000 times or 10,000 times).

(Measurement of Dielectric Constant and Dielectric Loss Tangent)

The dielectric constant and dielectric loss tangent of the obtained molded product sample were measured under the following conditions.

Measurement method: in conformity with IEC 62810 (cavity resonator perturbation method)
Sample shape: 55 mm or more in length, from 1.6 mm to 2.4 mm in width, from 0.7 mm to 1.0 mm in height
Test condition: frequency of 10 GHz
Number of times of measurement: 2
Conditioning: 23° C.±1° C., 50% RH±5% RH, 24 hours< Test chamber environment: 23° C.±1° C., 50% RH±5% RH

18

Measurement apparatus: PNA Network Analyzer N5222B (manufactured by Keysight Technologies, Inc.)
Cavity resonator: CP531 for 10 GHz (manufactured by Kanto Electronic Application and Development Inc.)

TABLE 1

| | | Example 1 | Example 2 | Comparative Example 1 | Comparative Example 2 |
|---|---|---|---|---|---|
| Particles | Long diameter (µm) | 1.96 | 2.16 | 1.55 | — |
| | $D_{SL}$ | 1.13 | 1.10 | 1.10 | — |
| | Aspect ratio | 1.20 | 1.17 | 1.38 | — |
| | Shell thickness (nm) | 97 | 235 | 54 | — |
| | Hollow ratio (%) | 72 | 46 | 78 | — |
| | BET specific surface area (m²/g) | 7.5 | 4.8 | 39 | — |
| | Pore volume 1-100 nm (cc/g) | 0.033 | 0.029 | 0.136 | — |
| | Pore volume 1-10 nm (cc/g) | 0.0043 | 0.0031 | 0.0242 | |
| | Breaking strength (MPa) | 20.8 | >20.8 | <7.8 | — |
| | Silanol group area (−/g) | 695 | 663 | 230,718 | — |
| Molded product | Resin (phr) | 100 | 100 | 100 | 100 |
| | Particles (phr) | 19.4 | 30 | 6 | — |
| | Density (g/ml) | 1.0655 | 1.1622 | 1.2178 | 1.2276 |
| | Porosity (%) | 19.5 | 13.9 | 3.2 | 0 |
| | Filler hollow ratio % | 72 | 54 | 52 | — |
| | Dielectric constant | 2.44 | 2.56 | 2.82 | 2.86 |
| | Dielectric loss tangent | 0.0126 | 0.0132 | 0.0212 | 0.0174 |

In Comparative Example 1, it can be recognized that the hollow ratio is significantly reduced through blending into the resin. In Comparative Example 1, the breakage of the hollow particles was recognized in the cross-sectional observation of the resin molded product, and as shown in FIG. 5C, the penetration of the resin into the hollow region was also able to be recognized. Meanwhile, in each of Examples, through the cross-sectional observation of the resin molded product, the penetration of the resin into the hollow region was not recognized, and it was able to be recognized that the breakage of the hollow particles was suppressed (particularly in Example 2).

A conceivable cause of the failure to achieve a reduction in dielectric loss tangent in Comparative Example 1 is the large silanol group amount.

The hollow particle according to at least one embodiment of the present invention may be typically suitably used for an electronic material. Besides, the hollow particle may be used for, for example, a heat-insulating material, a sound-proofing material, an impact-buffering material, a stress-buffering material, an optical material, and a light weighting material.

According to at least one embodiment of the present invention, the dielectric characteristics can be improved through use of the hollow particle whose primary particles have particle sizes that satisfy predetermined uniformity.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A hollow particle, comprising silica and Al, having a molar ratio of Al/Si of 0.0001 or more and 0.04 or less, having a breaking strength of 10 MPa or more, and having a $D_{SL}$ of primary particles that satisfies the following expression (1):

$$1 \leq D_{SL} \leq 1.5 \tag{1}$$

where $D_{SL}=D_{75L}/D_{25L}$, and $D_{25L}$ and $D_{75L}$ represent a 25th value and a 75th value, respectively, when long diameters of 100 randomly selected primary particles are measured in observation with a scanning electron microscope and sorted in order of increasing size.

2. The hollow particle according to claim 1, wherein the hollow particle has a BET specific surface area of 30 $m^2/g$ or less.

3. The hollow particle according to claim 1, wherein the hollow particle has a cumulative pore volume of pores having diameters of from 1 nm to 100 nm of 0.1 cc/g or less.

4. The hollow particle according to claim 1, wherein the hollow particle has a hollow ratio of 30% or more and 95% or less.

5. The hollow particle according to claim 1, wherein the hollow particle has an aspect ratio of less than 2.

6. The hollow particle according to claim 1, wherein the hollow particle has a long diameter of 0.5 μm or more and 10 μm or less.

7. The hollow particle according to claim 1, wherein the hollow particle has a shell thickness of 25 nm or more and 500 nm or less.

8. The hollow particle according to claim 1, wherein the silica is amorphous silica.

9. The hollow particle according to claim 1, further comprising Na, wherein the hollow particle has a molar ratio of Na/Si of 0.001 or more and 0.025 or less.

10. A resin composition, comprising:

a resin; and the hollow particle of claim 1.

11. A resin molded product, which is formed from the resin composition of claim 10.

12. A laminate, comprising a resin layer formed from the resin composition of claim 10.

13. The laminate according to claim 12, wherein the resin layer has a thickness of 25 μm or less.

14. A method of producing the hollow particle of claim 1, comprising:

coating a core particle with a shell-forming material to obtain a core-shell particle;

removing the core particle from the core-shell particle to obtain a hollow particle precursor; and coating the hollow particle precursor with a shell-forming material to produce the hollow particle.

15. The production method according to claim 14, wherein the core particle contains an alunite type compound represented by the following general formula (I):

$$M_a[Al_{1-x}M'_x]_3(SO_4^{2-})_y(OH)_z \cdot mH_2O \tag{I}$$

in the formula (I), M represents at least one kind of cation selected from the group consisting of: $Na^+$; $K^+$; $NH_4^+$; and $H_3O^+$, M' represents at least one kind of cation selected from the group consisting of: $Cu^{2+}$; $Zn^{2+}$; $Ni^{2+}$; $Sn^{4+}$; $Zr^{4+}$; and $Ti^{4+}$, and "a", "m", "x", "y", and "z" satisfy $0.8 \leq a \leq 1.35$, $0 \leq m \leq 5$, $0 \leq x \leq 0.4$, $1.7 \leq y \leq 2.5$, and $4 \leq z \leq 7$, respectively.

16. The production method according to claim 14, further comprising calcining the core-shell particle before the removing the core particle.

17. The production method according to claim 16, wherein the calcining the core-shell particle is performed at 650° C. or less.

18. The production method according to claim 14, further comprising calcining the hollow particle precursor coated with the shell-forming material.

19. The production method according to claim 18, wherein the calcining the hollow particle precursor is performed at 900° C. or more.

20. The production method according to claim 18, further comprising subjecting the hollow particle precursor to acid treatment before the calcining the hollow particle precursor.

21. The production method according to claim 14, wherein the shell-forming materials each contain sodium silicate.

* * * * *